United States Patent [19]

Smiley

[11] Patent Number: 5,383,735
[45] Date of Patent: Jan. 24, 1995

[54] MINIATURE KEYBOARD WITH SLIDING KEYS

[75] Inventor: Gregory W. Smiley, Etna, N.Y.

[73] Assignee: Smith Corona Corporation, Cortland, N.Y.

[21] Appl. No.: 278,195

[22] Filed: Jul. 21, 1994

Related U.S. Application Data

[62] Division of Ser. No. 95,470, Jul. 23, 1993.

[51] Int. Cl.$^6$ ............................. B41J 5/00; B41J 5/06
[52] U.S. Cl. ..................................... 400/479; 400/83; 400/485; 400/492; 345/168; 345/173; 341/22
[58] Field of Search .................. 400/83, 100, 472, 473, 400/479, 485, 486, 492; 345/168, 170, 173, 184; 341/21, 22, 23; 340/825.19

[56] References Cited

U.S. PATENT DOCUMENTS

| | | | |
|---|---|---|---|
| 3,428,747 | 2/1969 | Alferieff | 400/690.4 |
| 4,324,976 | 4/1982 | Lapeyre | 235/145 R |
| 4,369,439 | 1/1983 | Broos | 345/168 |
| 4,485,238 | 7/1984 | Learn | 340/365 R |
| 4,520,240 | 5/1985 | Swindler | 200/5 R |
| 4,550,221 | 10/1985 | Mabusth | 178/18 |
| 4,594,683 | 6/1986 | Frank | 341/21 |
| 4,722,621 | 2/1988 | Johnson | 400/110 |
| 4,870,458 | 9/1989 | Shibuya et al. | 345/173 |
| 4,916,308 | 4/1990 | Meadows | 250/221 |
| 4,926,010 | 5/1990 | Citron | 345/168 |
| 4,951,036 | 8/1990 | Grueter et al. | 345/184 |
| 5,008,809 | 4/1991 | Matsaki | 345/157 |
| 5,012,230 | 4/1991 | Yasuda | 345/184 |
| 5,087,910 | 2/1992 | Guyot-Sionnest | 340/711 |
| 5,115,231 | 5/1992 | Avila et al. | 345/184 |
| 5,153,386 | 10/1992 | Siefer et al. | 345/173 |
| 5,186,555 | 2/1993 | Chiba | 400/485 |
| 5,252,952 | 10/1993 | Frank et al. | 345/168 |
| 5,270,709 | 12/1993 | Niklsbacher | 341/22 |

Primary Examiner—David A. Wiecking
Assistant Examiner—Steven S. Kelley

[57] ABSTRACT

A miniature keyboard assembly for generating code signals representative of selected characters and functions. The assembly including at least one but preferably, two glide keys, each coupled to a depressible keybutton for controlling the movement of its respective keybutton. In one embodiment, each keybutton base carries an electrically conductive layer and is slidable on a membrane panel having thereon a plurality of signal code generating switches. The keybutton being movable along orthogonal axes in response to movement of the glide key. Each keybutton extends upwardly through a longitudinal slot opening in a lateral slide support member and then through a fitted opening in an indicator panel. The indicator panel also include an indicia marker which underlies a transparent keyboard panel and is visible therethrough. Finger movement of the glide key causes the marker to indicate the character or function on the keyboard representative of the signal code to be generated by the switch over which the keybutton is positioned. Depression of the keybutton results in the activation of the switch and the generation of the selected signal code.

8 Claims, 5 Drawing Sheets

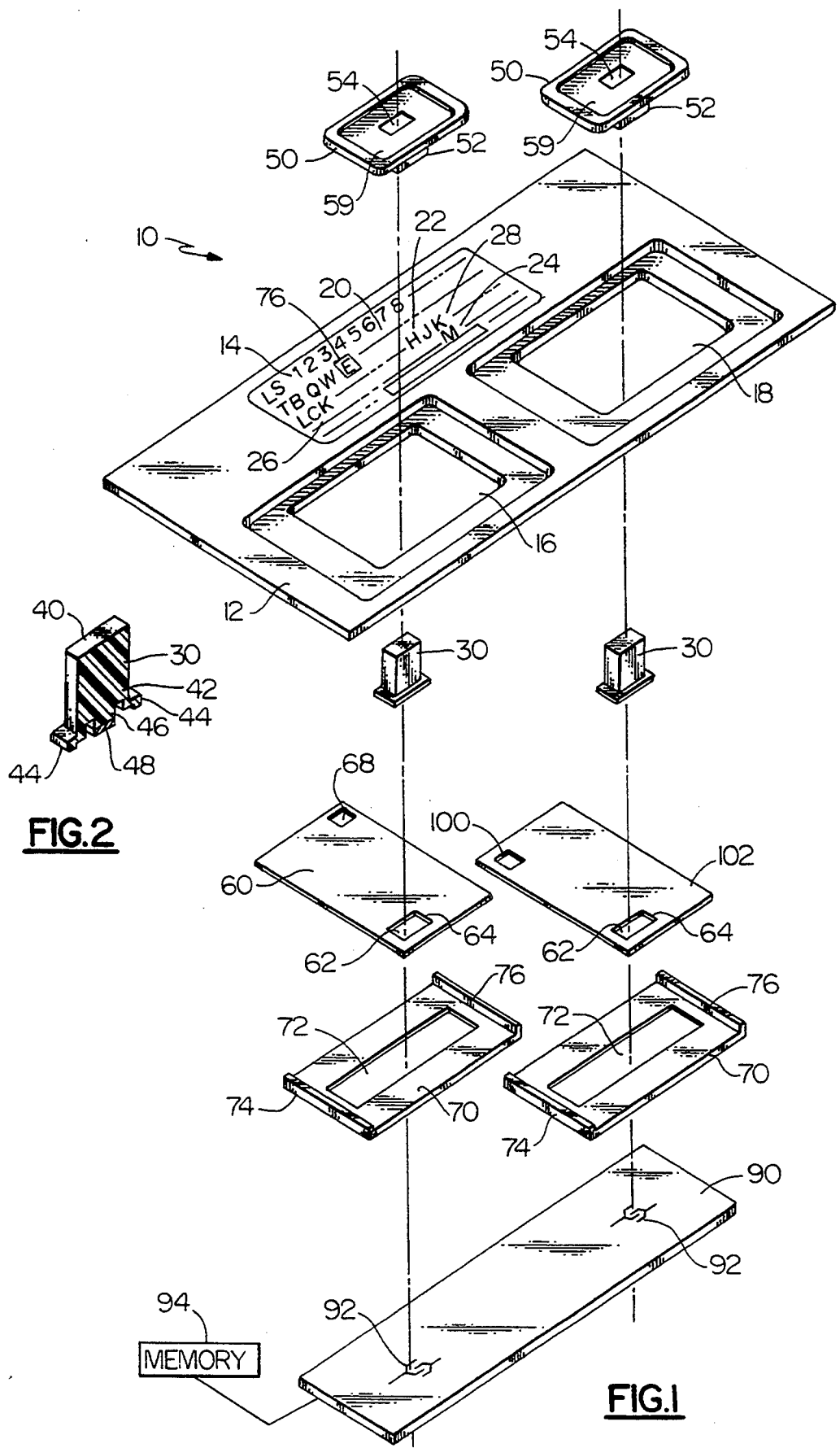

MINIATURE KEYBOARD WITH SLIDING KEYS

This application is a division of application Ser. No. 08/095,470, filed Jul. 23, 1993.

BACKGROUND OF THE INVENTION

1. Field of the Invention

The present invention relates generally to keyboards and more particularly pertains to miniature hand held electronic keyboard assemblies.

2. Description of the Prior Art

Electronic keyboards in their basic form include a plurality of position fixed depressible keys each associated with a specific character or function. Such keyboards are employed in a wide range of equipment such as typewriters and calculators and range in size from, for example, large computer keyboards to small credit card size keyboards. Where the keyboard is intended to be easily operated as in a computer or typewriter, then the keys and corresponding keyboards must be of appreciable size in order to accommodate a human finger. When, however, a small size keyboard is desired, consideration must be given to maintaining adequate key size for permitting comfortable key manipulation.

Presently available miniature keyboards with position fixed depressible keybuttons have extremely small and closely spaced keybuttons. These miniature keyboards are difficult to hand operate due to the size of the human finger and such hand operation may result in the unintentional simultaneous activation of several keybuttons or activation of an incorrect keybutton.

A number of techniques have recently been developed to reduce the number of required keybuttons so that for a given size keyboard, a larger keybutton may be used. Thus, U.S. Pat. No. 3,428,747 discloses a technique for achieving a substantial reduction in the total number of fixed operable keys by combining the characters and functions of various keys. Another technique, as shown in U.S. Pat. No. 4,324,976, includes a hand held fixed key calculator which includes first and second keyboards on the front and rear faces of the device, thus reducing the number of required keybuttons on one side of the calculator. Still further, U.S. Pat. No. 4,520,240 discloses a four way integral slide switch for control of cursor positioning reducing the number of switches and the size of the keyboard. The electronic one hand operable keyboard shown in U.S. Pat. No. 5,087,910 employs fixed switches each capable of assuming a plurality of states in response to finger activation. Each switch or key can be used to activate a plurality of characters or functions to thereby reduce the number of keys or switches required. U.S. Pat. No. 4,458,238 includes a device having a handle which supports a display board. The handle includes at least four fixed switches for selecting sequentially illuminated characters and functions illustrated on the board for data entry storage. Thus a reduced number of switches or keys may be achieved.

The keyboard assembly for selecting characters to be recorded disclosed in U.S. Pat. No. 4,722,621 includes a substrate which carries an array of displayed characters. Movement of a character selection device along two axes of the array serves to control the recording of the character selected. The physical movement of the selection device by the operator positions the print element for recording and generates analog signals identifying the selected character. The analog data is then converted into digital data which is processed and stored.

SUMMARY OF THE INVENTION

The present invention comprises a miniature keyboard for use in portable and desktop electronic devices such as typewriters, word processors, organizers and personal digital assistants including peripheral attachments for these devices. This keyboard includes an electronic membrane panel having a plurality of code generating switches, and at least -one keybutton movable in two directions so as to be capable of overlaying any one such switch. The keybutton includes an upper glide portion for receiving the fingertip of the user in order to move the keybutton, and a lower electrically conductive portion for contacting and activating a selected one of the switches. An indicator means coupled to the keybutton may include a colored marker area which overlays a character/function keyboard panel to provide a visual indication of the character/function of the switch overlaid by the keybutton. Upon depression of the keybutton, the keyboard assembly generates a code signal indicative of the character/function associated with that displayed within the marker area.

Accordingly, it is an object of this invention to provide a low cost, reliable, portable, miniature keyboard assembly.

Another object of this invention is to provide a simple keyboard assembly employing at least one glide keybutton for visually selecting characters and generating code signals indicative of the selected characters.

A further object of the present invention is to provide a reliable miniature keyboard assembly that is easily operable.

Other objects and many of the attendant advantages of this invention will be readily appreciated as the same become better understood by references to the following detailed description when considered in connection with the accompanying drawings in which like references numerals designate like parts throughout the figures thereof.

BRIEF DESCRIPTION OF THE DRAWINGS

FIG. 1 is an exploded perspective view of a first embodiment of the keyboard assembly constructed in accordance with the principles of the present invention;

FIG. 2 is a perspective view in section of the keybutton constituting a portion of the keyboard assembly of FIG. 1;

DETAILED DESCRIPTION OF THE PREFERRED EMBODIMENT

Figure 3:
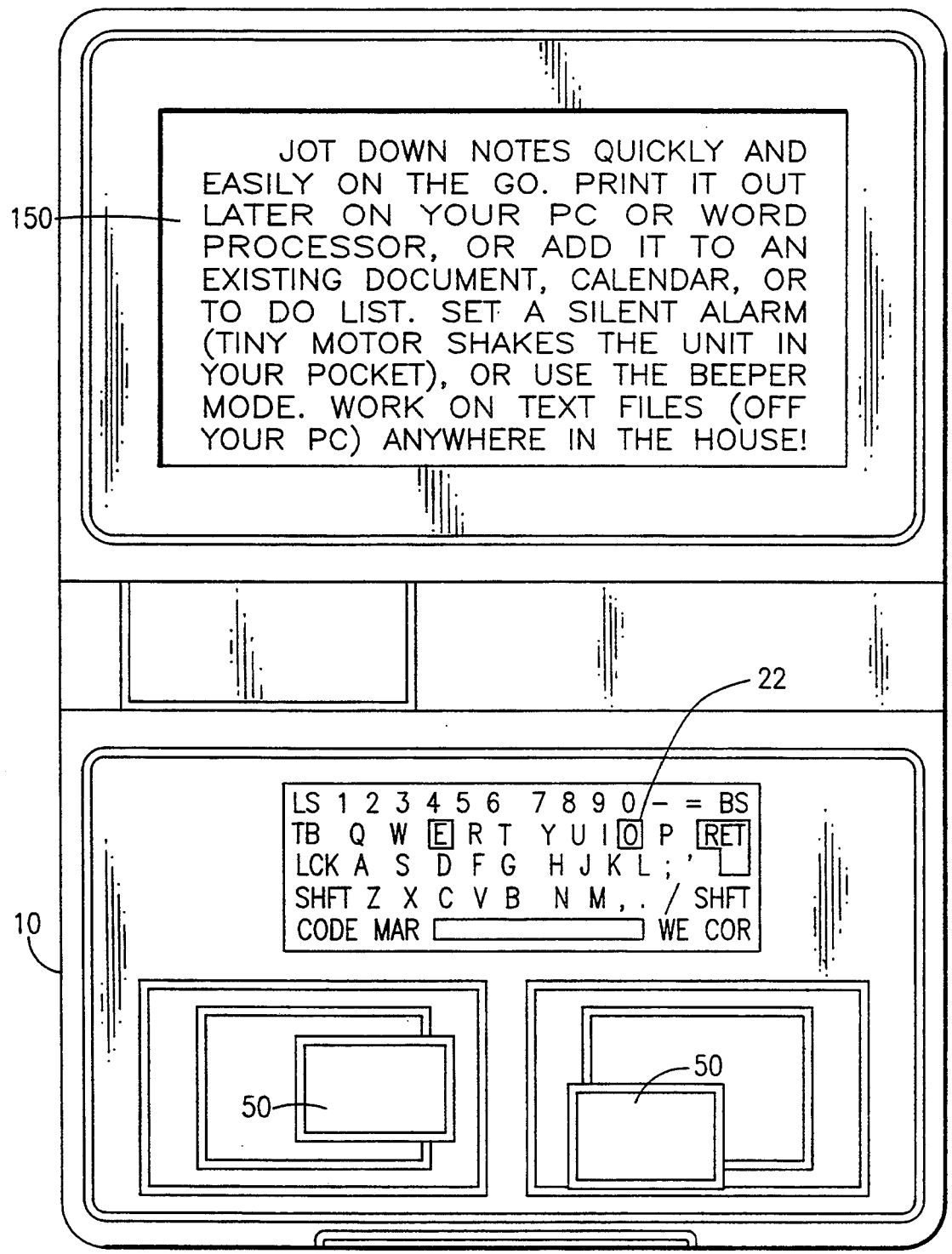
FIG. 3 is a front elevational view of a word processor incorporating the keyboard assembly of FIG. 1.

In the illustrated embodiment of FIG. 1 the miniature keyboard 10 includes a housing member 12 formed with a transparent window 14 and a pair of left and right openings 16 and 18. These openings 16 and 18 can be combined to form one larger opening. A transparent keyboard panel 20 is provided with a printed keyboard layout 22 of the character and function symbols 24 normally associated with a typewriter. This layout 22 can include other arrangements of symbols, icons, characters and functions not related to typewriters. As illustrated, the keyboard panel 20 may be divided into two halves 26 and 28 in order, for example, to suggest left hand and right hand data entries. The keyboard panel 20 is mounted on the underside of the transparent window 14 of housing member 12 so that the representative characters and function symbols 24 are readily visible. As an alternative, the transparent keyboard panel 20 can be mounted above the housing member 12.

Flexible keybuttons 30, one for each division of the keyboard panel 20, are formed, for example, of rubber. Each keybutton 30 is formed with an upstanding portion 40 (also see FIG. 2) and at its base 42 with laterally extending shoulders 44. Extending downwardly from the keybutton base area 42 is a central extension 46 that carries on its lower surface an electrically conductive layer 48 affixed thereto, for example, by cement.

Figure 4:
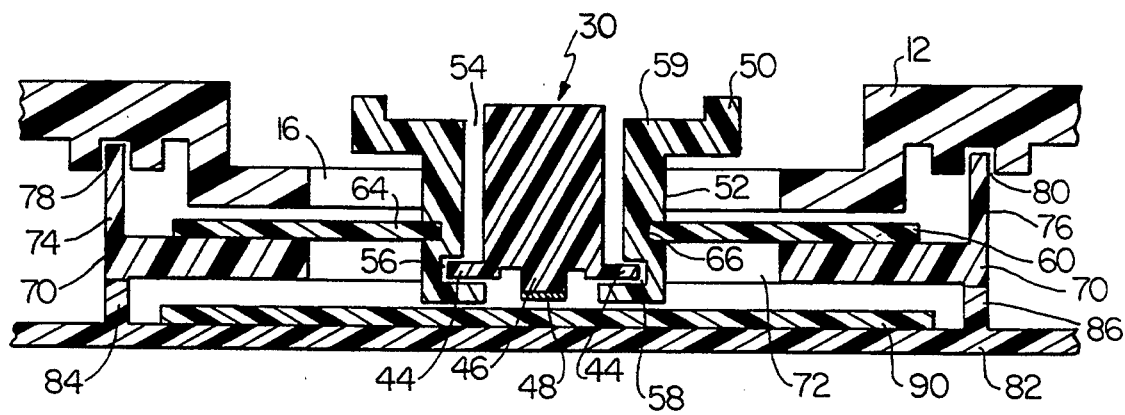
FIG. 4 is an enlarged sectional view of the first embodiment of the keyboard assembly.

Referring to FIGS. 1 and 4, a glide key 50 is slidably supported on the housing member 12 with a lower extension 52 passing through the opening 16. The glide key 50 has a central opening 54 for receiving the keybutton 30. A pair of grooves 56 and 58 are formed in the lower extension 52 of the glide key 50 and are exposed to the central opening 54. The shoulders 44 of the keybutton 30 are seated in the grooves 56 and 58. The glide key 50 has an upper recess surface 59 to accommodate the thumb or fingertip of the operator. The upstanding portion 40 of the keybutton 30 projects slightly above the recess surface 59.

Figure 5:
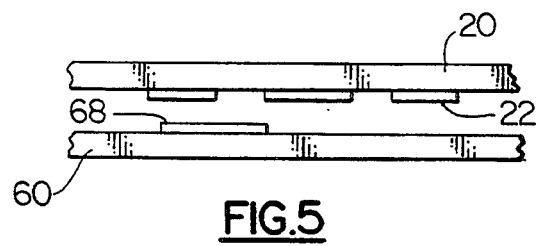
FIG. 5 is an elevational view showing a portion of one embodiment of the keyboard panel and indicator panel.
Figure 6:
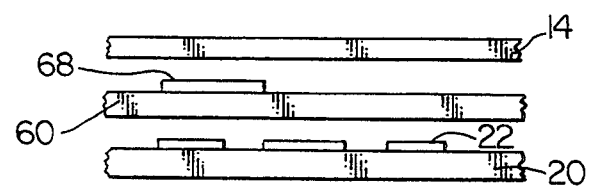
FIG. 6 is an elevational view showing a portion of a second embodiment of the keyboard panel and indicator panel.

As indicator panel 60 is located below the keyboard panel 20 (FIGS. 1 and 5) and has a fitted opening 62 for receiving the lower extension 52 of the glide key 50. The edges 64 forming the opening 62 are seated in grooves 66 formed in the glide key 50 to couple the indicator panel 60 to the glide key 50. As an alternative, the indicator panel 60 can be located above the keyboard panel 20 (FIG. 6). The indicator panel 60 is provided with an indicia marker 68 located, preferably, proximate one corner, which is near the center of the keyboard panel 20. The indicia marker 68 can take the form of a translucent colored square or a blank square outlined by a series of connected lines. It is preferable that the square should be slightly larger than the character symbols 24 on the keyboard panel 20.

A slide support member 70 is located below the indicator panel 60 and has a longitudinal slot opening 72 for receiving the lower extension 52 of the glide key 50. The lower extension 52 of the glide key 50 can slide along the slot opening 72 to the left and right without moving the slide support member 70. The slide support member 70 has a pair of opposed edge guide rails 74 and 76 extending in a direction transverse to the direction of the longitudinal slot opening 72. The guide rail 74 is seated in a glide slot 78. The guide rail 76 is seated in a glide slot 80. The glide slots 78 and 80 are integrally formed on the underside of the housing member 12. The slide support member 70 is movable in the slots 78 and 80 toward and away from the panel 20 by moving the glide key 50.

A frame member 82 is located below the slide support member 70 and has a first finger 84 projected upward and in alignment with the guide rail 74 for maintaining the guide rail 74 in the guide slot 78. A second finger 86 projects upward from the frame member 82 and in alignment with the guide rail 76 for maintaining the guide rail 76 in the glide slot 80.

A membrane panel 90 is located below the glide key 50 and is supported on the frame member 82. The membrane panel 90 has a plurality of code generating switches 92 which correspond to the individual character and function symbols 24 shown on the keyboard panel 20. The membrane panel 90 is connected to a memory 94 in a processor.

A second keybutton 30 and the corresponding assembly is substantially identical to the above-described assembly. One difference is an indicia marker 100 which is located, preferably, proximate one corner on a indicator panel 102, which is near the center of the keyboard panel 20. One membrane panel 90 is used for both keybuttons 30 and corresponding assemblies.

When the keyboard 10 is assembled and in use, one of the glide keys 50 is moved by the operator's thumb or finger laterally and vertically to position the marker 68 directly above the desired characters, for example, above the letter "E" 76 of keyboard panel 20. With the marker 68 correctly positioned, depression of the keybutton 30 causes an outward bending of the shoulders 44 to thereby permit the electrically conductive layer 48 to contact and activate the switch 92. Upon activation, the switch 92 results in the generation of the signal code indicative of the selected character or function (i.e. of the letter "E"). This code may be of digital form or any other suitable data form.

Figure 7:
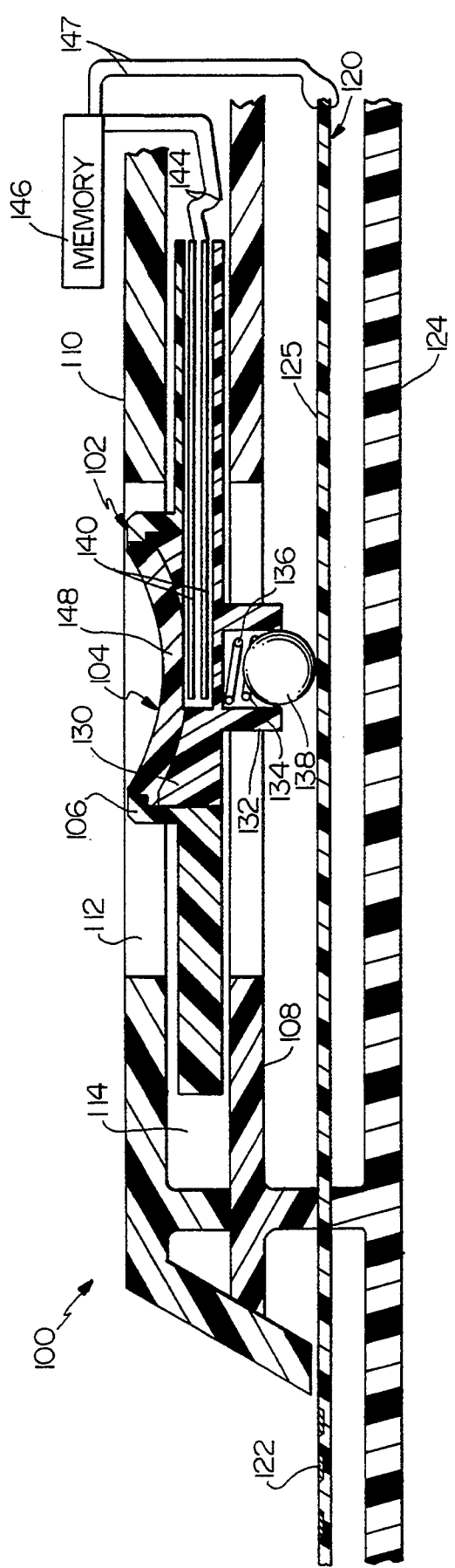
FIG. 7 is an enlarged sectional view of a second keyboard assembly.
Figure 8:
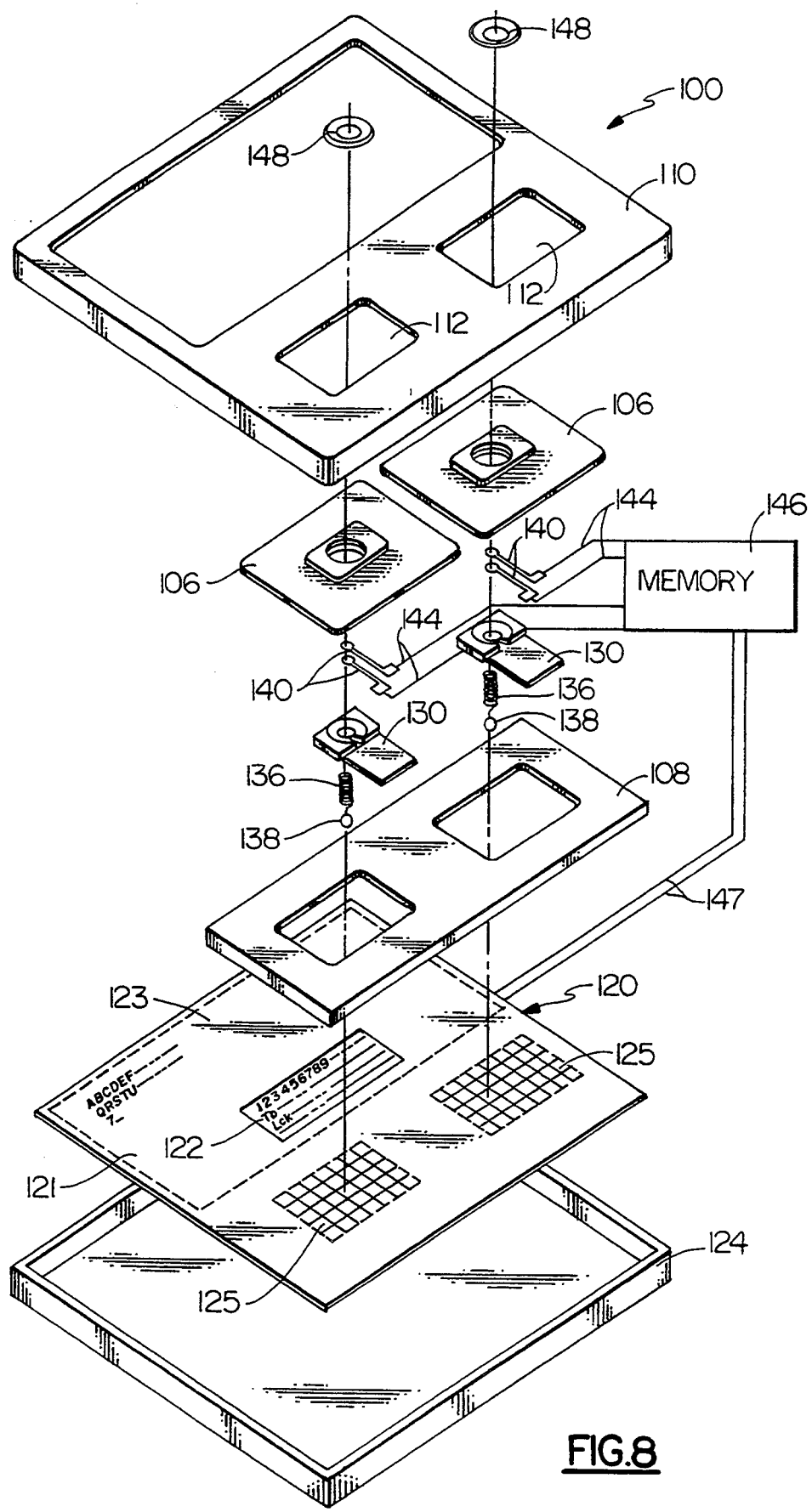
FIG. 8 is an exploded perspective view of the second embodiment of the keyboard assembly constructed in accordance with the principles of the present invention.

Referring to FIGS. 7 and 8, the second embodiment of a glide key assembly 100 includes a glide key 102 formed by a keybutton 104 and a keybutton support 106. The glide key 102 is slidably supported on an intermediate housing member 108. An upper housing member 110 has a first opening 112 for the keybutton 104 and forms a second opening 114 for the glide key 102 to slide therein. A liquid crystal display ("LCD") touch panel 120 is located below the glide key 102. The LCD display touch panel 120 includes a display 121, which has a keyboard layout 122 of a standard keyboard of character and function symbols and a character display 123. The LCD display panel 120 also has code coordinates on an X-Y axis grid 125. The LCD touch panel 120 may, for example, be of the type sold by Carrol Touch Inc. of Round Rock, Tex. A lower housing member 124 supports the LCD display touch panel 120, the intermediate housing member 108, the glide key 102 and the upper housing member 110.

The keybutton 104 is formed from a first plastic material 130 which includes a downward extending stem 132 having a central opening 134 therein. A coil compression spring 136 and a ball bearing 138 are seated in the central opening 134. The ball bearing 138 rolls against the X-Y axis grid 125 on the LCD display touch panel 120. A switch 140 is located in the first plastic material 130 and Above the ball bearing 138. A pair of wires 144 connects the switch 140 to a memory 146 in a processor. A pair of wires 147 connects the LCD display touch panel 120 to the memory 146. The keybutton 104 is also formed from a second plastic, rubber or any suitable material 148, which is flexible.

The glide key 102 may be moved by the operator's thumb or finger laterally and vertically to position the ball bearing 138 at a selected location on the LCD display touch panel 120. The ball bearing 138 moves a cursor or box on the keyboard layout 122 to the selected location. The LCD touch panel 120 operates in such a manner that as the ball bearing 138 is moved on the LCD touch panel 120, by movement of glide key 102, and depresses different points on the membrane of the LCD touch panel 120, different characters on the keyboard layout 122 are highlighted. The specific character highlighted on the printed keyboard layout is determined by the particular point on the membrane of the LCD touch panel 120 which is depressed by ball bearing 138. Similarly, the specific character to be entered into memory is determined by the location of the ball bearing 138 on the LCD touch panel 120 which switch 140 is closed. When the desired character is highlighted in the keyboard layout 122, the glide key 102 can be depressed to select the character. The flexing of the second material 148 closes the switch 140 and the information determined by the location of ball bearing 138, is transmitted to the memory 146 and to a display 150 (FIG. 3), when combined therewith.

The glide key 102 can also be used as a pointing device, similar to a mouse, to highlight and select text or create insertion points.

The miniature keyboard described above can be used in a variety of environments and with many components such as in a pocket sized personal word processor (FIG. 3). The signal codes generated by the switches of the keyboard can be stored in the memory of a processor (not shown) and visualized on a word processor display (FIG. 3). The keyboard panel (FIG. 1) can take the form of an LCD character/function display panel or similar display element. Such a display panel provides the operator with the option of changing from one form (QWERTY) of keyboard to another (ICONS or pop-up windows). The keyboard layout could be combined within the word processor display, for example, as a window feature. With the addition of an extra bank of numerical keys and a bank of four cursor keys, the standard QWERTY keyboard can be converted to the well known 101 computer keyboard.

For alternate variations of each embodiment, the keyboard assembly can be mounted in a separate housing or can be located under or behind a display.

Obviously, many modifications and variations of the present invention are possible in the light of the above teachings. It is therefore understood that, within the scope of the appended claims, the invention may be practiced otherwise than specifically described.

Having thus described the invention, what is claimed as novel and desired to secure Letters Patent is:

1. An electronic device for storing characters in memory comprising a liquid crystal display touch panel having a plurality of contacts thereon being associated with characters to be displayed and stored, at least two keybutton each movable in at least a horizontal and vertical direction in relation to said contacts on said liquid crystal display touch panel and switch means operable to cause the character associated with the position of each of the keybuttons on the liquid crystal display touch panel to be stored in memory.

2. An electronic device for storing characters in memory according to claim 1 wherein indicating means on said liquid crystal display touch panel indicate the character associated with the position of each of the keybuttons on the liquid crystal display touch panel.

3. An electronic device for storing characters in memory according to claim 1 including means having a horizontal opening for guiding each of the keybuttons in a horizontal direction and the keybuttons extending through the horizontal opening.

4. An electronic device for storing characters in memory according to claim 1 wherein a spring urged ball bearing is located beneath each of said movable keybuttons for movement on said liquid crystal display touch panel.

5. An electronic device for storing characters in memory according to claim 1 including a glide key for moving each of the keybuttons in a horizontal and vertical direction.

6. An electronic device for storing characters in memory according to claim 5 wherein each of the keybuttons extends through an opening in the glide key for movement therewith.

7. An electronic device for storing characters in memory according to claim 1 including a key housing having an opening through which each of the keybuttons extends for movement therein.

8. An electronic device for storing characters in memory according to claim 1 wherein the key housing has an opening through which the liquid crystal display touch panel may be viewed.

* * * * *